United States Patent

[11] 3,609,134

| [72] | Inventor | Rudolf Mory<br>Dornach, Switzerland |
|---|---|---|
| [21] | Appl. No. | 762,163 |
| [22] | Filed | Sept. 24, 1968 |
| [45] | Patented | Sept. 28, 1971 |
| [73] | Assignee | Ciba-Geigy A.G.<br>Basle, Switzerland |
| [32] | Priority | Oct. 10, 1967, July 25, 1968 |
| [33] | | Switzerland |
| [31] | | 14143/67 and 11205/68 |

[54] AZO PIGMENTS CONTAINING A 4-CARBOXAMIDO PHENOMORPHOLENE-(3) GROUP
14 Claims, No Drawings

[52] U.S. Cl........................................ 260/152,
8/4, 8/41 R, 8/41 B, 8/41 C, 8/41 D, 8/50, 106/23,
106/288, 117/138.8 R, 117/138.8 B, 117/138.8 D,
117/138.8 E, 117/138.8 F, 117/143 F, 117/144,
260/37 R, 260/37 N, 260/40 R, 260/41 C,
260/157, 260/247.5 R, 260/558 D, 260/559 A,
260/559 S, 260/999

[51] Int. Cl......................................... C09b 29/36,
C09b 35/18, D06p 1/04

[50] Field of Search............................. 260/152,
154, 155, 156, 157, 158

[56] References Cited
UNITED STATES PATENTS

| 1,567,731 | 12/1925 | Gunther .................. | 260/152 |
|---|---|---|---|
| 2,364,351 | 12/1944 | Dickey .................... | 260/154 |
| 2,883,374 | 4/1959 | Enders .................... | 260/152 X |
| 2,908,678 | 10/1959 | Goebel et al............. | 260/154 |
| 3,043,827 | 7/1962 | Straley et al............. | 260/152 |
| 3,118,870 | 1/1964 | Dietz et al................ | 260/154 |
| 3,124,565 | 3/1964 | Schilling et al. ......... | 260/157 |

*Primary Examiner*—Floyd D. Higel
*Attorneys*—Harry Goldsmith, Joseph G. Kolodny, Bryant W. Brennan and Edward J. Sites

ABSTRACT: Compounds of the formula $R_1-N=N-R_2-CONH-R_3$, in which $R_1$ and $R_3$ each represents an aryl or a heterocyclic residue, at least one of the residues $R_1$ and $R_3$ being a phenomorpholone-⅓3¼ residue, and $R_2$ represents a hydroxynaphthalene residue in which the azo, hydroxy and carboxylic acid amide groups are in 1,2,3-position or the residue of an enolizable or enolized ketomethylene compound are valuable pigments which are useful for coloring plastics and lacquers in fast yellow to red shades of excellent fastness properties.

AZO PIGMENTS CONTAINING A 4-CARBOXAMIDO PHENOMORPHOLENE-(3) GROUP

The present invention is based on the observation that valuable new water-insoluble azo pigments of the formula $$R_1-N=N-R_2\cdot CONHR_3 \quad (1)$$

in which $R_1$ and $R_3$ each represents an aryl or a heterocyclic residue, at least one of the residues $R_1$ and $R_3$ being a phenomorpholone-(3) residue, and $R_2$ represents a hydroxynaphthalene residue in which the azo, hydroxy and carboxylic acid amide groups are in 1,2,3-position, or the residue of an enolizable or enolized ketomethylene compound, may be obtained by (a) condensing a carboxylic acid halide of the formula $$R_1-N=N-R_2\cdot COhal$$

with an amine of the formula $$R_3NH_2,$$

or (b) coupling a diazo or diazoamino compound of an amine of the formula $R_1NH_2$ with a coupling component of the formula $$R_2CONH-R_3,$$

the components being so selected that one of the residues $R_1$ or $R_3$ contains a phenomorpholone residue.

Since the products of the invention are pigments, they must not contain groups imparting solubility in water, especially acidic groups imparting solubility in water, for example, sulfonic acid groups or carboxylic acid groups.

Products that are of special interest are those of the formula

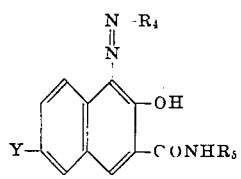

in which $R_4$ represents a benzene residue, $R_5$ represents a phenomorpholone-(3) residue and Y represents a hydrogen atom or an alkoxy or cyano group. These pigments preferably correspond to the formula

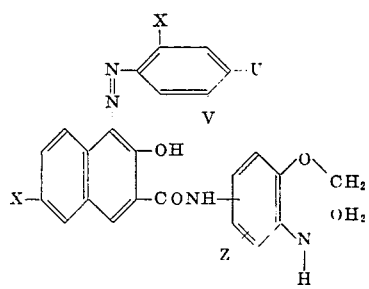

(3)

in which X represents a halogen atom or an alkyl, alkoxy, phenoxy, nitro or carboxylic acid ester group, U represents a hydrogen or a halogen atom or a nitro or trifluoromethyl group, V represents a hydrogen or a halogen atom or a trifluoromethyl or carboxylic acid amide group, Z represents a hydrogen or a halogen atom or an alkyl group and Y has the meaning give above, X, Y, Z, U and V may be further defined as X being hydrogen, chlorine, lower alkyl, lower alkoxy, phenoxy, nitro or lower carbalkoxy, Y being hydrogen, bromine, methoxy or cyano; Z being hydrogen, chlorine, lower alkyl or lower alkoxy; U being hydrogen, chlorine, nitro or trifluoromethyl; and V being hydrogen, chlorine, trifluoromethyl or carboxylic amide group selected from the group consisting of -CONH-aryl, wherein aryl is benzene, naphthalene or para-diphenyl or benzene, naphtalene or para-diphenyl substituted with chloro, lower alkyl, lower alkoxy or trifluoromethyl; and a phenomorpholone-(3) group of the formula

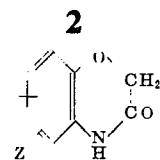

wherein Z is selected from the group consisting of hydrogen, chloro, lower alkyl or lower alkoxy.

Pigments having specially good properties are those corresponding to the formula

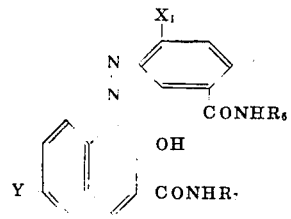

in which $X_1$ represents a halogen atom or an alkyl or alkoxy group, $R_6$ and $R_7$ each represents a benzene or a phenomorpholone-(3) residue, at least one of the residues $R_6$ and $R_7$ representing a phenomorpholone-(3) residue, and Y and Z have the meanings given above.

Also of interest are pigments of the formula

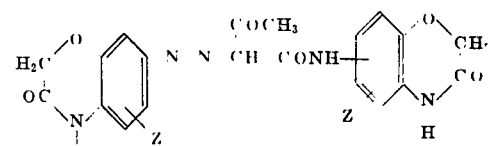

or

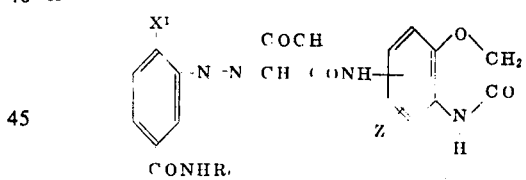

or

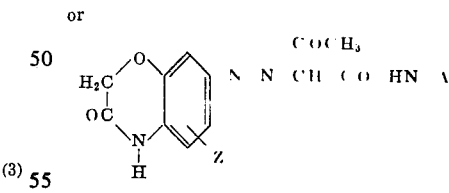

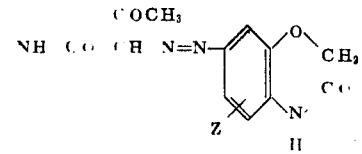

or

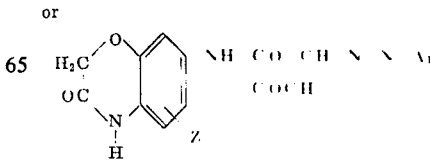

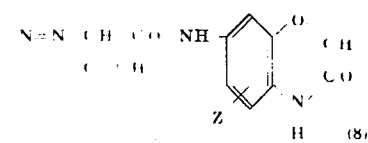

in which formula A represents an arylene residue, especially a phenylene or a diphenylene residue, $A_1$ represents an arylene residue, especially a diphenylene residue, and $R_6$, $X_1$ and Z have the meanings given above.

The dyestuffs of the formula (2) may advantageously be obtained by condensing an azo dyestuff carboxylic acid chloride of the formula

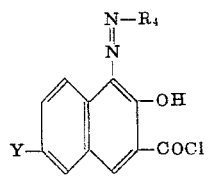
(9)

with an aminophenomorpholone.

The azo dyestuff carboxylic acids, from which the acid chlorides of the formula (9) are prepared, may be obtained by coupling a diazo compound of an amine of the formula $R_4$-$NH_2$ with a 2,3-hydroxynaphthoic acid of the formula

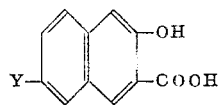

which is substituted at 6-position, if desired, with a halogen atom or an alkoxy or cyano group.

The following are given as examples of diazotizable amines of the formula $R_4NH_2$:
aniline, and especially halogenated anilines, for example, 2-nitroaniline, 3- or 433,4-dichloroaniline, 2,3-dichloroaniline, 2,4-dichloroaniline, 2,5-dichloroaniline, 2,6-dichloraniline, 2,4,5-trichloroaniline, 2,4,6-trichloroaniline, 2-, 3- or 4-bromoaniline, 2,4-dibromoaniline, 2,5-dibromoaniline, 2-methyl-5-chloroaniline, 2-methyl-4-chloroaniline, 2-methyl-3-chloroaniline, 2-chloro-5trifluoromethylaniline also nitroanilines, for example, 2-, 3- and 4-nitroaniline, 4-chloro-2-nitroaniline, 2-chloro-4-nitroaniline, 4-methyl-3-nitroaniline, 2,4-dimethyl-3-nitroaniline, 2-methyl-5-nitroaniline, 2-methyl-4-nitroaniline, and also alkoxy and phenoxy anilines, for example, 2- and 4-methoxyaniline, 2-and 4-ethoxyaniline, 3-chloro-4-methoxyaniline, 2-methoxy-5-nitroaniline, 2-methoxy-5-chloroaniline, 2-methoxy-5trifluoromethylaniline, 2-amino- 4-trifluoromethyl-4'-chlorodiphenylether, 2-nitro-4-ethoxyaniline, 2-methoxy-4-chloro-5-methylaniline, 2-amino-4 -chlorodiphenylether, 2-amino-2,4-dichlorodiphenylether, 2-amino-4,4'-dichlorodiphenylether, 2-amino-4 trifluoromethyldiphenylether, 4-amino-2-trifluoromethyldiphenylether, 4-amino-2-trifluoromethyl-2',4'-dichlorodiphenylether, 1-amino-2-carboxylic acid methylester and also 1-amino-2-chloro-5-carboxylic acid methylester, 2-amino-5-nitrobenzoic acid methylester, 4-amino-3-nitrobenzotrifluoride, 2-amino-5-nitrobenzotrifluoride, 1-amino-2-chlorobenzene-5-carboxylic acid methylamide, 2,5-dimethoxy-4-benzoylaminoaniline, 2,5dimethyl-4benzoylaminoaniline, 2-chloro-5-methoxy-4-benzoylaminoaniline, 2-methoxy-5-methyl-4-benzoylaminoaniline, but especially 4-methyl-3-aminobenzoic acid amide, 4-methyl-3-aminobenzoic acid anilide, 4-methyl-3-aminobenzoic acid-2'-chloro-5'-trifluoromethylanilide, 4-chloro-3-aminobenzoic acid-3',5'-bis-trifluoromethylanilide, 4-chloro-3--aminobenzoic acid-2',4',5'-trichloroanilide, 2,4-dichloro-5-aminobenzoic acid-2',5'-dichloroanilide, 2,4-dichloro-5 -aminobenzoic acid-2',4'-dichloroanilide, 2,4-dichloro-5-aminobenzoic acid-3'-trifluoromethylanilide, 2,4-dichloro-5-aminobenzoic acid-3'-chloroanilide, 2,4-dichloro-5-aminobenzoic acid amide, 5-amino-4-methoxy-2-chlorobenzoic acid-3'-trifluoromethylanilide, 4-methyl-3-aminobenzoic acid-2',5'-dichloroanilide, 4-methyl-3-aminobenzoic acid-3'-trifluoromethylanilide, 4-methoxy-3-aminobenzoic acid amide, 4-methoxy-3-aminobenzoic acid anilide, 4-methoxy-3-aminobenzoic acid-3'-chloroanilide, 4-methoxy-3-aminobenzoic acid-2',5'-dichloroanilide, 4-methoxy-3-aminobenzoic acid-2',4',5'-trichloroanilide, 4-carbomethoxy-3-aminobenzoic acid anilide, 4-methoxy-3-aminobenzoic acid-3'-trifluoromethylanilide, 4-carbethoxy-3-aminobenzoic acid-2',5'-dichloroanilide, 4-methoxy-3-aminobenzoic acid-3',5'-bis-trifluoromethylanilide, 4-methoxy-3-aminobenzoic acid-2'-chloro-5' trifluoromethylanilide, 4-methoxy-3-aminobenzoic acid-2',5'-dimethoxy-4'-chloroanilide and 4-methoxy-3-aminobenzoic acid-2',5'-dimethyl-4'-chloroanilide.

The azo dyestuff carboxylic acids thus obtained are treated with substances which are capable of converting carboxylic acids into their halides, for example, their chlorides or bromides, such substances being, in particular, phosphorus halides, for example, phosphorus pentabromide, phosphorus trichloride or phosphorus pentachloride, phosphorus oxyhalides and preferably thionyl chloride.

The treatment with the said acid halogenating agents is advantageously carried out in an inert organic solvent, for example, dimethylformamide, a chlorobenzene, for example monochlorobenzene or dichlorobenzene, toluene, xylene, or nitrobenzene. If desired, dimethylformamide may be used in conjunction with the last five solvents specified.

When preparing the carboxylic acid halides, it is generally advantageous first to dry the azo compounds which are prepared in an aqueous medium, or to free them from water by azeotropic distillation in an organic solvent. If desired, azeotropic drying may be carried out immediately prior to the treatment with the acid halogenating agents.

The azo dyestuff carboxylic acid chlorides so obtained are then condensed with an aminophenomorpholone-(3), preferably a 7-aminophenomorpholone-(3) of the formula

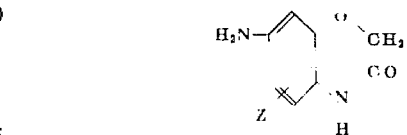

in which Z represents a hydrogen or a halogen atom or an alkyl or alkoxy

The following are given as examples of aminophenomorpholones-(3)
7-aminophenomorpholone-(3), 7-amino-6-methylphenomorpholone-(3) 7-amino-6-methoxyphenomorpholone-(3) 7-amino-6-chlorophenomorpholone-(3), 6-aminophenomorpholone-(3) and 6-amino-8-chlorophenomorpholone-(3).

The pigments of the formula (4) may advantageously be obtained by condensing an azo dyestuff carboxylic acid chloride of the formula

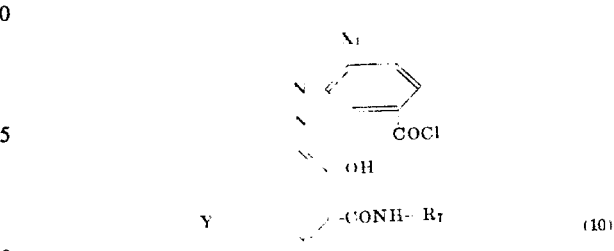
(10)

with an aminobenzene or an aminophenomorpholone-(3), and the pigments of formula (6) may be obtained by condensing an azo dyestuff carboxylic acid chloride of the formula

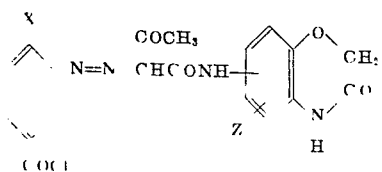

(11)

with an aminobenzene or an aminophenomorpholone-(3).

The azo dyestuff carboxylic acids from which the azo dyestuff carboxylic acid chlorides of formula (11) are derived may be obtained by coupling a diazo compound of an aminobenzoic acid of the formula

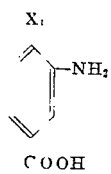

for example, of 3-amino-4-chloro-, 3-amino-4-methyl- or 3-amino-4-methoxy-benzoic acid, with the corresponding acetoacetylaminophenomorpholone.

Condensation between the carboxylic acid halides of the kind defined above the the aminophenomorpholone-(3) or aminobenzene is advantageously carried out in an anhydrous medium. Under these conditions it generally proceeds surprisingly easily, even at temperatures within the boiling range of the common organic solvents, for example, toluene, monochlorobenzene, dichlorobenzene, trichlorobenzene, nitrobenzene and the like. To accelerate the reaction, it is generally advantageous to use an agent capable of binding acid, for example, anhydrous sodium acetate or pyridine. Some of the products obtained are crystalline and some are amorphous and they are generally obtained in a very good yield and in a pure state. It is expedient first to isolate the acid chlorides obtained from the carboxylic acids. In some cases, however, isolation of the acid chlorides may be omitted without harm and condensation may be carried out immediately after preparation of the carboxylic acid chlorides.

The pigments of the formula (2) may also be obtained by coupling a diazo compound of an aminobenzene of the formula $R_4$—$NH_2$ with a naphthol of the formula

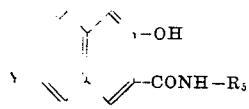

The pigments of the formula (5) may also advantageously be obtained by coupling a diazotized aminophenomorpholone with the corresponding acetoacetylaminophenomorpholone.

Finally, the pigments of the formula (8) are also best obtained by a coupling process, namely by coupling a diazotized arylenediamine with the corresponding acetoacetylaminophenomorpholone, and the pigments of formula (7) may be obtained by coupling a diazotized aminophenomorpholone-(3) with a bisacetoacetyla- rylenediamine in a molar ratio of 2:1.

Coupling is advantageously effected by gradual addition of the aqueous alkaline solution of the coupling component to the acidic solution of the diazonium salt. The alkali metal hydroxide used to dissolve the coupling component is advantageously used in an amount such that there is sufficient present to neutralize the mineral acid liberated from the diazonium salt during coupling. Coupling is advantageously carried out at a pH value of 4 to 6. The pH value is advantageously adjusted by the addition of a buffer. Suitable buffers are, for example, the salts, especially the alkali metal salts, of formic acid, phosphoric acid or especially acetic acid. The alkaline solution of the coupling component advantageously contains a wetting agent, a dispersing agent or an emulsifying agent, for example, an aralkylsulphonate, for example, dodecylbenzenesulphonate or the sodium salt of 1,1'-naphtylmethanesulphonic acid, polycondensation products of alkylene oxides, for example, the product obtained by reacting ethylene oxide with paratertiary-octyl-phenol, and also the alkylesters of sulphoricinoleates, for example n-butylsulphoricinoleate. The dispersion of the coupling component may also advantageously contain protective colloids, for example, methylcellulose or small amounts of inert organic solvents which are sparingly soluble or insoluble in water, for example, aromatic hydrocarbons which may be halogenated or nitrated, for example, benzene, toluene, xylene, chlorobenzene, dichlorobenzenes or nitrobenzene, as well as aliphatic halogenated hydrocarbons, for example, carbon tetrachloride or trichloroethylene; also suitable are organic solvents miscible with water, for example acetone, ethylene glycol monomethylether, methylethylketone, methanol, ethanol, isopropanol or dimethylformamide.

Coupling may also be carried out advantageously by continuously combining an acidic solution of the diazonium salt with an alkaline solution of the coupling component in a mixing nozzle whereby coupling takes place instantaneously. Care must be taken to ensure that diazo component and coupling component are present in the mixing nozzle in equimolecular amounts, but it may be advantageous to use a small excess of coupling component. The simplest way of doing this is by control of the pH value of the liquid in the mixing nozzle. Care must also be taken to ensure that the two solutions are in a state of violent turbulence in the mixing nozzle. The pigment dispersion formed is removed continuously from the mixing nozzle and the pigment is isolated by filtration.

In process (c) of the invention, the new pigments may be obtained by heating a diazoamino compound containing the residue $R_1$ together with the coupling component in an organic solvent or in an aqueous organic solvent, preferably in the presence of an acid.

The aryldiazoamino compounds to be used in accordance with the invention may be obtained by a known process by condensing an aryldiazonium salt with a primary amine or preferably with a secondary amine. A very wide variety of amines are suitable for this purpose, for example aliphatic amines, for example, methylamine, ethylamine ethanolamine, propylamine, butylamine, hexylamine and especially dimethylamine, diethylamine diethanolamine, methylethanolamine, dipropylamine or dibutylamine, aminoacetic acid, methylaminoacetic acid, butylaminoacetic acid, aminoethane sulfonic acid, methylaminoethanesulphonic acid, guanylethane sulfonic acid β-aminoethyl sulfuric acid alicyclic amines for example, cyclohexylamine, N-methycyclohexylamine, dicyclohexylamine; aromatic amines, for example 4-aminobenzoic acid, sulfanilic acid, 4-sulpho-2-aminobenzoic acid (4-sulphophenyl)-guanidine, 4-N-methylaminobenzoic acid 4-ethylaminobenzoic acid, 1-aminonaphthalene 4sulfonic acid, 1-aminonaphthalene,2,4-disulphonic acid, heterocyclic amines, for example, piperidine, morpholine, pyrrolidine, dihydroindol, and also sodium cyanamide or dicycanodiamide.

Generally, the diazoamino compounds obtained are sparingly soluble in cold water and, if necessary may be separated from the reaction medium in a crystalline form by salting out. In many cases, the moist-press cake may be used as it is for further reactions. In some cases, it may be advantageous to dehydrate the diazoamino compounds by vacuum drying prior to the reaction.

Coupling of the diazoamino compound with the naphthol may be carried out in an organic solvent, for example, chlorobenzene, ortho-dichlorobenzene, nitrobenzene, pyridine, ethylene glycol, ethylene glycol monomethylether or ethylene glycol monoethylether, dimethylformamide, formic acid or acetic acid. When using a solvent which is miscible with water, it is not necessary to use the diazoamino compound in an anhydrous form. For example, the water-moist filter cake may be used. Splitting of the diazoamino compound which precedes coupling is carried out in an acid medium. When a neutral solvent is used, it is necessary to add an acid, for example, hydrochloric acid, sulfuric acid, formic acid or acetic acid.

Coupling is advantageously carried out with the application of heat, preferably at a temperature within the range of from 80° to 180° C., and it generally proceeds quickly and is complete.

By virtue of their insolubility, the pigments obtained may be isolated from the reaction mixture by filtration. Since the byproducts remain in solution, the pigments are obtained in a very pure state. Pigments that have been obtained by coupling in an aqueous medium are advantageously subjected to an aftertreatment with an organic solvent. Further advantages of the processes of the invention are the high yield, the production of the pigments in a form suitable for use and the constant properties of the pigments obtained.

By virtue of their advantageous properties, the pigments obtained in accordance with the processes of the invention may be used for a very wide variety of purposes. For example, they may be used in a finely divided form for the coloration of material of high molecular weight, for example, cellulose ethers and esters, polyamides, polyurethanes and polyesters, lacquers and lake-formers, solutions or products made from cellulose acetate, nitrocellulose, natural or synthetic resins, for example, polymerization resins or condensation resins, for example, aminoplasts, alkyd resins, and phenoplasts, and also polyolefines, for example, polyethylene, polypropylene, polystyrene, polyvinyl chloride, polyacrylonitrile, rubber, casein, silicones and silicon resins. They may also be used advantageously in the manufacture of colored pencils, cosmetic preparations and laminated sheet material.

The following examples illustrate the invention. Unless otherwise stated, the parts and percentages are by weight.

EXAMPLE 1

3.9 Parts by volume of dimethylformamide and 7.1 parts by volume of thionyl chloride are added to 27.4 parts of the dyestuff obtained by coupling diazoitized 1-(3'-amino-4'-chlorobenzoylamino)-2-chloro-5-trifluoromethylbenzene with 2,3-hydroxynaphthoic acid in 250 parts by volume of chlorobenzene. The mixture is heated for 12 hours at 55° to 60 C. and then allowed to cool. The crystalline dyestuff acid chloride is isolated by filtration, washed with a small amount of benzene and dried in vacuo at 60° to 70° C. 23.1 Parts of the chloride are obtained (81.6 percent of the theoretical yield).

17.0 Parts of the chloride so obtained together with 5.57 parts of 7-aminophenomorpholone-(3) are heated for 12 hours at 130° to 140° C. in 1,300 parts by volume of chlorobenzene. The pigment which forms is then isolated by filtration while hot, washed with hot ortho-diochlorobenzene, ethanol and water and then dried in vacuo at 60° to 70° C. 15.7 Parts (75.5 percent of the theoretical yield) of a brown powder are obtained. The pigment corresponds to the formula

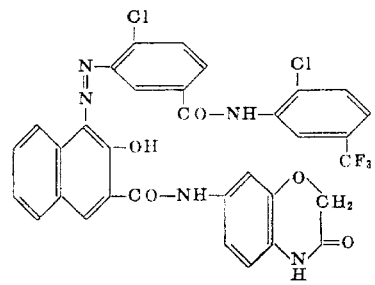

The following table lists further components from which pigments can be obtained in the manner described above. Column I lists the diazo base used, Column II the condensation base and Column III indicates the shade produced by the pigment in polyvinyl chloride film.

| | I | II | III |
|---|---|---|---|
| 1 | 1-(3'-amino-4'-chlorobenzoylamino)-2,5-dichlorobenzene | 7-amino-phenomorpholone-(3) | Yellow-brown. |
| 2 | 1-(3'-amino-4'-chlorobenzoylamino)-benzene | do | Red-brown. |
| 3 | 1-(3'-amino-4'-chlorobenzoylamino)-2,5-dichlorobenzene | 6-methoxy-7-aminophenomorpholone-(3) | Brown. |
| 4 | 1-(3'-amino-4'-methylbenzoylamino)-3-trifluoromethylbenzene | 7-amino-phenomorpholone-(3) | Scarlet. |
| 5 | 1-(3'-amino-4'-methylbenzoylamino)-2,5-dichlorobenzene | do | Red. |
| 6 | 3-amino-4-methyl-benzoic acid-phenylamide | do | Red. |
| 7 | 1-(3'-amino-4'-methoxybenzoylamino)-3-trifluoromethylbenzene | do | Blue-red. |
| 8 | 1-(3'-amino-4'-chlorobenzoylamino)-2-methoxybenzene | 6-methyl-7-aminophenomorpholone-(3) | Yellow-brown. |
| 9 | 2,4,5,-trichloro-1-aminobenzene | do | Brown. |
| 10 | 2,5-dichloro-1-aminobenzene | do | Do. |
| 11 | 2-chloro-5-trifluoromethyl-1-aminobenzene | do | Yellow-brown. |
| 12 | 1-(3'-amino-4'-chlorobenzoylamino)-2-chloro-5-trifluoromethylbenzene | do | Brown. |
| 13 | 1-(3'-amino-4'-chlorobenzoylamino)-3-trifluoromethylbenzene | do | Red. |
| 14 | 1-(3'-amino-4'-chlorobenzoylamino)-2-trifluoromethyl-4-chlorobenzene | do | Yellow-brown. |
| 15 | 3-amino-4-chlorobenzoic acid phenylamide | do | Red. |
| 16 | 1-(3'-amino-4'-chlorobenzoylamino)-2-chloro-5-trifluoromethyl-benzene | 6-chloro-7-aminophenomorpholone-(3) | Scarlet. |
| 17 | 1-(3'-amino-4'-methylbenzoylamino)-2-chloro-5-trifluoromethylbenzene | do | Do. |
| 18 | 1-(3'-amino-4'-chlorobenzoylamino)-2,4-dichlorobenzene | do | Orange. |
| 19 | 1-(3'-amino-4'-chlorobenzoylamino)-3-trifluoromethylbenzene | do | Scarlet. |
| 20 | 1-(3'-amino-4'-chlorobenzoylamino)-2-trifluoromethyl-4-chlorobenzene | do | Orange. |
| 21 | 1-amino-2-methoxy-4-chlorobenzene | do | Red. |
| 22 | 3-amino-4-chloro-benzoic acid phenylamide | do | Reddish orange. |
| 23 | 1-(3'-amino-4'-chlorobenzoylamino)-2,4,5-trichlorobenzene | do | Brownish orange. |
| 24 | 1-amino-2,4,5-trichlorobenzene | 7-amino-phenomorpholone-(3) | Yellowish brown. |
| 25 | 1-amino-2-chloro-5-trifluoromethylbenzene | do | Brown. |
| 26 | 1-(3'-amino-4'-chlorobenzoylamino)-2,4-dichlorobenzene | do | Brownish red. |
| 27 | 1-(3'-amino-4'-chlorobenzoylamino)-2-trifluoromethyl-4-chlorobenzene | do | Scarlet. |
| 28 | 1-(3'-amino-4'-methylbenzoylamino)-2,4-dichlorobenzene | do | Red. |
| 29 | 1-(3'-amino-4'-methoxybenzoylamino)-2-methylbenzene | do | Ruby. |
| 30 | 1-amino-2-nitro-4-trifluoromethylbenzene | do | Yellowish brown. |
| 31 | 1-(3'-amino-4'-methylbenzoylamino)-2-methylbenzene | do | Scarlet. |
| 32 | 1-(3'-amino-4'-methylbenzoylamino)-2-chlorobenzene | do | Do. |
| 33 | 1-(3'-amino-4'-chlorobenzoylamino)-2-methylbenzene | do | Reddish orange. |
| 34 | 1-(3'-amino-4'-chlorobenzoylamino)-2-chlorobenzene | do | Do. |
| 35 | 1-amino-2-methoxy-4-nitrobenzene | do | Claret. |
| 36 | 1-(3'-amino-4'-methylbenzoylamino)-2-trifluoromethyl-4-chlorobenzene | do | Scarlet. |
| 37 | 1-(3'-aminobenzoylamino)-2-chloro-5-trifluoromethylbenzene | do | Brownish orange. |
| 38 | 1-(3'-amino-4'-chlorobenzoylamino)-3-trifluoromethylbenzene | do | Orange. |
| 39 | 1-(3'-amino-4'-methylbenzoylamino)-2-chloro-5-trifluoromethylbenzene | do | Reddish brown. |
| 40 | 1-(3'-amino-4'-chlorobenzoylamino)-2,4-dichlorobenzene | 6-methyl-7-aminophenomorpholone-(3) | Yellowish brown. |
| 41 | 1-(3'-amino-4'-chlorobenzoylamino)-2-methylbenzene | do | Scarlet. |
| 42 | 1-(3'-amino-4'-methoxybenzoylamino)-2-methylbenzene | do | Ruby. |
| 43 | 1-amino-2-nitro-4-trifluoromethylbenzene | do | Brown. |
| 44 | 1-(3'-amino-4'-methylbenzoylamino)-2-chloro-5-trifluoromethyl benzene | do | Do. |
| 45 | 1-amino-2-methoxy-4-chlorobenzene | do | Blue-red. |

| | I | II | III |
|---|---|---|---|
| 46 | 1-(3'-amino-4'-methylbenzoylamino)-2-methoxybenzene | do | Scarlet. |
| 47 | 1-(3'-amino-4'-methylbenzoylamino)-2-methylbenzene | do | Red. |
| 48 | 1-(3'-amino-4'-methylbenzoylamino)-2-chlorobenzene | do | Red. |
| 49 | 1-(3'-amino-4'-chlorobenzoylamino)-2,4-dichlorobenzene | 6-amino-8-chlorophenomorpholone-(3) | Red. |
| 50 | 1-(3'-amino-4'-methoxybenzoylamino)-2-chlorobenzene | 7-amino-phenomorpholone-(3) | Bluish-red. |
| 51 | 6-chloro-7-aminophenomorpholone-(3) | 6-chloro-7-aminophenomorpholone-(3) | Claret. |
| 52 | 1-amino-2-chloro-4-methylbenzene | do | Scarlet. |
| 53 | 1-amino-2,5-dichlorobenzene | 6-methoxy-7-aminophenomorpholone-(3) | Yellowish brown. |
| 54 | 1-(3'-amino-4'-chlorobenzoylamino)-2-trifluoromethyl-4-chlorobenzene | do | Do. |
| 55 | 3-chloro-4-aminophenylmethylsulphone | 6-methyl-7-aminophenomorpholone-(3) | Do. |
| 56 | 1-(3'-aminobenzoylamino)-2-chloro-5-trifluoromethylbenzene | do | Do. |
| 57 | 1-(3'-amino-4'-methoxybenzoylamino)-benzene | do | Red. |
| 58 | do | 6-chloro-7-aminophenomorpholone-(3) | Red. |
| 59 | do | 6-methoxy-7-aminophenomorpholone-(3) | Scarlet. |
| 60 | do | 6-amino-phenomorpholone-(3) | Ruby. |
| 61 | do | 6-amino-8-chlorophenomorpholone-(3) | Do. |
| 62 | 1-(3'-amino-4'-methoxybenzoylamino)-3-trifluoromethylbenzene | 6-methyl-7-aminophenomorpholone-(3) | Scarlet. |
| 63 | do | 6-chloro-7-aminophenomorpholone-(3) | Do. |
| 64 | 1-(3'-amino-4'-methylbenzoylamino)-3-trifluoromethylbenzene | 6-amino-8-chlorophenomorpholone-(3) | Red. |
| 65 | do | 6-chloro-7-aminophenomorpholone-(3) | Scarlet. |
| 66 | do | 6-methoxy-7-aminophenomorpholone-(3) | Reddish orange. |
| 67 | do | 6-methyl-7-aminophenomorpholone-(3) | Scarlet. |

EXAMPLE 2

A mixture comprising 37.05 parts of the dyestuff obtained by coupling diazotized 3-amino-4-chlorobenzene-1-carboxylic acid with 2,3-hydroxynaphthoic acid, 150 parts by volume of chlorobenzene, 1.6 parts by volume of dimethylformamide and 16.5 parts by volume of thionyl chloride is heated for 3 hours at 70° to 75° C. and then allowed to cool. The dyestuff acid chloride in the form of coarse crystals is isolated by filtration and dried. 38 Parts of the acid chloride are obtained.

8.15 Parts of the acid chloride so obtained, together with 8.8 parts of 6-amino-8-chlorophenomorpholone-(3) and 3.2 parts by volume of pyridine, are heated for 12 hours at 130° to 140° C. in 500 parts by volume of chlorobenzene. The pigment which forms is isolated by filtration while hot and washed with hot chlorobenzene, hot alcohol and water. After drying in vacuo at 60° to 70° C., 13.1 parts of the pigment are obtained in the form of a dark red powder. When incorporated in polyvinyl chloride film in a finely divided form it produces a bloomy, red coloration which is fast to migration. The pigment corresponds to the formula

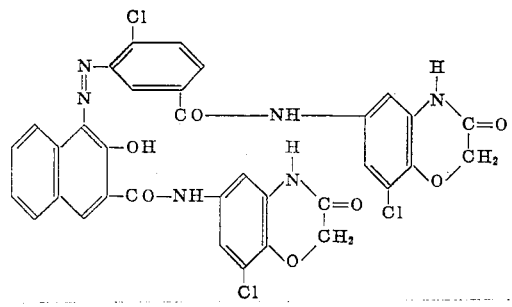

A brown pigment may be obtained by replacing the 6-amino-8-chlorophenomorpholone-(3) mentioned in the second paragraph above with 6-methoxy-7-aminophenomorpholone-(3).

Example 3

0.8 Part by volume of dimethylformamide and 14.2 parts by volume of thionyl chloride are added to 51 parts of the dyestuff obtained by coupling diazotized 3-amino-4-chlorobenzene-1-carboxylic acid with 1-(2',3'-hydroxynaphthoylamino)-2-methoxy-5-chlorobenzene, in 350 parts by volume of chlorobenzene. The mixture is heated to 130° to 140° C. and then 30 minutes later a further 0.4 part by volume of dimethylformamide and 7.2 parts by volume of thionyl chloride are added. After a further 30 minutes, the batch is allowed to cool and the crystallized dyestuff acid chloride is isolated in the usual manner. 50.7 Parts of the acid chloride are obtained.

5.3 Parts of the acid chloride so obtained, together with 2.1 parts of 6-amino-8-chlorophenomorpholone-(3) and 0.8 part by volume of pyridine, are heated for 12 hours at 130° to 140° C. in 250 parts by volume of chlorobenzene. The pigment is then isolated by filtration while hot, washed with hot chlorobenzene, hot alcohol and water and dried. 5.9 Parts of a red powder are obtained which colors polyvinyl chloride a scarlet shade which is fast to migration. The pigment corresponds to the formula

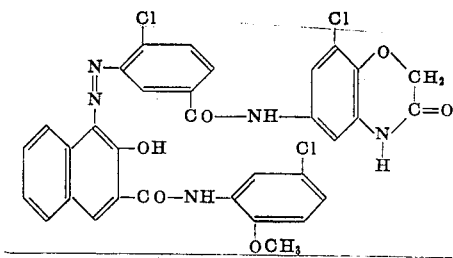

A very similar result may be obtained by replacing the 6-amino-8-chlorophenomorpholone-(3) mentioned in the second paragraph above with 6-methyl-7-aminophenomorpholone-(3); 6-methoxy-7-aminophenomorpholone-(3) leads to the production of an orange shade.

Example 4

2.95 Parts of 1-(3'-amino-4'-chlorobenzoylamino)-2-methyl-5-chlorobenzene are dissolved in 10 parts by volume of glacial acetic acid with 3 parts by volume of concentrated hydrochloric acid and then diazotized at 0° to 5° C. with 5 parts by volume of 2N sodium nitrite. The batch is stirred for 30 minutes, diluted with an equal volume of ice water, and then the diazo solution is run during 15 minutes into a solution of 3.35 parts of 7-(2',3'-hydroxynaphthoylamino)-phenomorpholone-(3) in 150 parts by volume of dimethylformamide to which 2 parts of anhydrous sodium acetate have been added. Coupling takes place instantaneously. After 2 hours, the pigment is isolated by filtration, washed with dimethylformamide, water and methanol and then dried. 5.8 Parts of the pigment of the formula

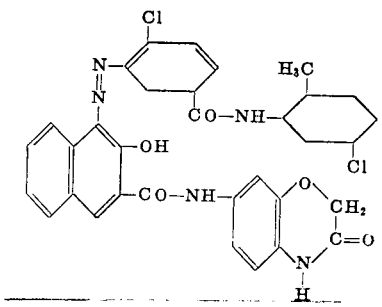

are obtained. When converted into a state of fine division by one of the usual methods, the pigment imparts to polyvinyl chloride a dull red shade that is fast to migration.

The 7-(2',3'-hydroxynaphthoylamino)-phenomorpholone-(3) may be obtained by condensing 2,3-hydroxynaphthoic acid with 7-aminophenomorpholone-(3) in toluene with phosphorus trichloride as condensing agent. It has a melting point above 300° C.

Example 5

21.6 Parts of the azo dyestuff carboxylic acid obtained by coupling diazotized 3-amino-4-chlorobenzene-1-carboxylic acid with 7-acetoacetylaminophenomorpholone-(3) in a medium acidified with acetic acid, together with 0.4 part by volume of dimethylformamide and 7.1 parts by volume of thionyl chloride, are heated for 3½ hours at 65° to 70° C. in 250 parts by volume of chlorobenzene. A suspension of fine crystals in the form of needles is formed. After cooling, the batch is filtered and the filter residue is dried in vacuo at 50° to 60° C. 21.8 Parts of the azo dyestuff carboxylic acid chloride are obtained.

4.5 Parts of the acid chloride so obtained are heated for 12 hours at 130° to 140° C. in 150 parts by volume of orthodichlorobenzene in admixture with 1.7 parts of 1-amino-2,5-dichlorobenzene. After this period the pigment which forms is isolated by filtration while hot, washed successively with hot ortho-dichlorobenzene, dimethylformamide, methanol and water and then dried. 3.5 Parts of a greenish yellow pigment powder are obtained which colors polyvinyl chloride a greenish yellow shade which is fast to migration. The pigment probably corresponds to the following formula

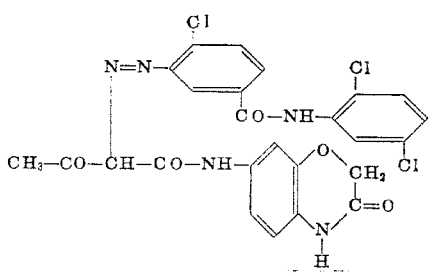

Pigments having very similar properties may be obtained by replacing the 1-amino-2,5-dichlorobenzene mentioned in the second paragraph above with an equivalent amount of 4-aminonaphthostyryl or 1-amino-2,5-dichloro-4-benzoylamino-benzene.

Further pigments may be obtained by the process described in this example when 6-chloro-7-acetoacetylaminophenomorpholone-(3) is used as a coupling component instead of 7-acetoacetylaminophenomorpholone-(3), and the azo dyestuff carboxylic acids thus obtained are condensed after conversion into the acid chlorides with the amines given in column I of the following table.

| | I | II |
|---|---|---|
| 1 | Aminobenzene | Greenish yellow. |
| 2 | 1-amino-2,5-dichlorobenzene | Do. |
| 3 | 1-amino-2,5-dichloro-4-benzoylaminobenzene | Yellow. |
| 4 | 6-chloro-7-aminophenomorpholone-(3) | Greenish yellow. |

The acetoacetylaminophenomorpholones-(3) used in this and the following examples may easily be obtained by reacting the appropriate aminophenomorpholones-(3) with diketene in an acetic acid medium. They have the following melting points:

| | |
|---|---|
| 7-acetoacetylaminophenomorpholone-(3) | 176-179° C |
| 7-acetoacetylamino-6-chlorophenomorpholone-(3) | 210-211° C |
| 7-acetoacetylamino-6-methylphenomorpholone-(3) | >250° C |
| 7-acetoacetylamino-6-methoxyphenomorpholone-(3) | 253-255° C |
| 6-acetoacetylamino-8-chlorophenomorpholone-(3) | 210-211° C |

EXAMPLE 6

3.26 Parts of 3,3'-dichloro-4,4'-diaminodiphenyl dihydrochloride are stirred for 2 hours in 20 parts by volume of water together with 5 parts by volume of concentrated hydrochloric acid. A small amount of ice is added and then 5 parts by volume of a 4N sodium nitrite solution are added dropwise to 0° to 5° C. within 30 minutes. The batch is stirred for 1 hour at 0° to 5° C. and then the tetrazo solution is clarified by filtration. This solution is then run at 10° to 15° C. within 15 minutes to a solution of 5 parts of 7-acetoacetylaminophenomorpholone-(3) in 60 parts by volume of dimethylformamide to which 6.55 parts of anhydrous sodium acetate have been added. The coupling mixture is stirred overnight, the pigment which forms is isolated by filtration and then washed with water and alcohol and dried. 7.7 Parts of a brown, hard product are obtained which may converted into a state of fine division by one of the usual methods. It then colors polyvinyl chloride a strong, orange shade which is fast to migration. The pigment corresponds to the formula

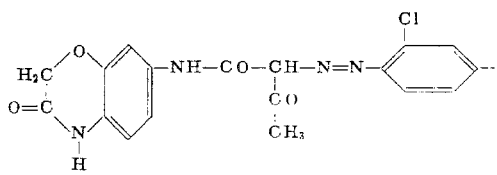

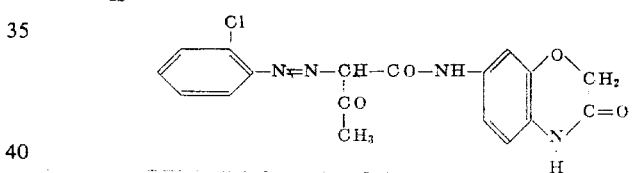

EXAMPLE 7

1.78 Parts of 6-methyl-7-aminophenomorpholone-(3) are stirred in 10 parts by volume of water together with 2.5 parts by volume of concentrated hydrochloric acid. The batch is cooled to 0° C. by external cooling, 10 parts of ice are added, and diazotization is effected within 5 to 10 minutes by the dropwise addition of 5 parts by volume of a 2N sodium nitrite solution. The batch is stirred for 30 minutes, a small amount of sulfamic acid is added to destroy any small excess of sodium nitrite that may be present, and then small amounts of impurities are removed by filtration. This solution is run into a mixture of 2.62 parts of a 6-methyl-7-acetoacetylaminophenomorpholone-(3), 50 parts by volume of dimethylformamide and 3.3 parts of anhydrous sodium acetate within half an hour. The batch is stirred for several hours at room temperature and then the pigment that forms is isolated by filtration, washed with water and menthanol and dried. To convert the pigment into a form suitable for coloristic purposes, it is pulverized and heated from 120° to 180° C. within 30 minutes in 75 parts by volume of dimethylsulphoxide. After cooling, the recrystallized pigment is isolated by filtration, washed with water and methanol and dried. 4.3 Parts of a bright yellow powder are obtained which colors polyvinyl chloride a strong yellow shade possessing good fastness to migration and light. The pigment corresponds to the formula

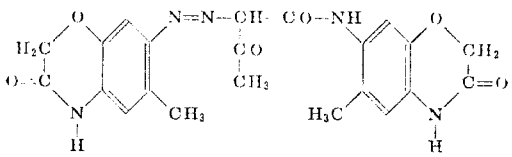

The following table lists further components from which pigments may be obtained by the process described above. Column I lists the diazo component, column II the coupling component and column III the shade produced with the pigment in polyvinyl chloride.

| | I | II | III |
|---|---|---|---|
| 1 | 6-methoxy-7-aminophenomorpholone-(3) | 6-methoxy-7-acetoacetylamino phenomorhpolone-(3) | Yellow. |
| 2 | ..do.... | 7-acetoacetylaminophenomorpholone-(3) | Do. |
| 3 | ..do.... | 6-methyl-7-acetoacetylaminophenomorpholone-(3) | Do. |
| 4 | 6-chloro-7-aminophenomorpholone-(3) | 7-acetoacetylaminophenomorpholone-(3) | Orange. |
| 5 | ..do.... | 6-methyl-7-acetoacetylaminophenomorpholone-(3) | Greenish yellow |
| 6 | ..do.... | 6-chloro-7-acetoacetylaminophenomorpholone-(3) | Yellow. |
| 7 | 6-methyl-7-amonophenomorpholone-(3) | ...do... | Greenish yellow |
| 8 | ..do.... | 7-acetoacetylaminophenomorpholone-(3) | Orange. |
| 9 | 7-amino-phenomorpholone-(3) | 6-methyl-7-acetoacetylaminophenomorpholone-(3) | Yellow. |
| 10 | ..do.... | 7-acetoacetylaminophenomorpholone-(3) | Do. |
| 11 | 1-(3'-amino-4'-chlorobenzoylamino)-2-chloro-5-trifluoromethylbenzene. | 6-chloro-7-acetoacetylaminophenomorpholone-(3) | Greenish yellow. |
| 12 | 6-methyl-7-aminophenomorpholone-(3) | | Do. |
| 13 | 6-methoxy-7-aminophenomorpholone-(3) | 5-acetoacetylaminobenzimidazolone | Brown. |
| 14 | ..do.... | 4-acetonacetylaminonaphthostyril. | Yellow. |
| 15 | ..do.... | 6-chloro-7-acetoacetylaminophenomorpholone-(3) | Orange. |
| 16 | 7-amino-phenomorpholone-(3) | 5-acetoacetylaminobenzimidazolone | Yellow. |
| 17 | ..do.... | 4-acetoacetylaminonaphthostyril. | Do. |
| 18 | ..do.... | 6-chloro-7-acetoacetylaminophenomorpholone-(3) | Greenish yellow |
| 19 | ..do.... | 6-methoxy-7-acetoacetylaminophenomorpholone-(3) | Do. |
| 20 | 6-chloro-7-aminophenomorpholone-(3) | 5-acetoacetylaminobenzimidazolone | Do. |
| 21 | ..do.... | 4-acetoacetylaminonaphthostyril. | Brownish orange. |
| 22 | ..do.... | 6-methoxy-7-acetoacetylaminophenomorpholone-(3) | Yellow. |
| | | 7-(2',3'-hydroxynapthoylamino)-phenomorpholone-(3) | Maroon. |

EXAMPLE 8

A mixture is prepared from 65 parts of polyvinyl chloride, 35 parts of dioctyl phthalate and 0.2 part of the pigment obtained in the manner described in example 1 and worked to and fro on a two-roller mill for 7 minutes at 140° C. A brown film possessing a very good fastness to light and migration is obtained.

I claim:

1. A pigment selected from the group consisting of a compound of the formula $$R_1-N=N-R_2-CONH-R_3$$

wherein $R_1$ and $R_3$ are each selected from the group consisting of a benzene radical of the formula

wherein V represents hydrogen, chlorine, trifluoromethyl, carboxylic amide group selected from the group consisting of -CONH-aryl, wherein aryl is benzene, naphthalene or para-diphenyl or benzene, naphthalene or para-diphenyl substituted with chloro, lower alkyl, lower alkoxy or trifluoromethyl, or phenomorpholine-(3) group of the formula

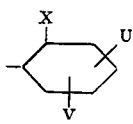

wherein Z is selected from the group consisting of hydrogen, chloro, lower alkyl or lower alkoxy; X is hydrogen, chlorine, lower alkyl, lower alkoxy, phenoxy, chlorophenoxy, lower alkylphenoxy, nitro or carbomethoxy; U is hydrogen, chlorine, nitro or trifluoromethyl; and phenomorpholine-(3) radical of the radical

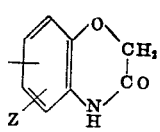

wherein Z is hydrogen, chlorine, lower alkyl or lower alkoxy at least one of $R_1$ and $R_3$ being a phenomorpholine-(3) radical; $R_2$ is selected from the group consisting of a group of the formula

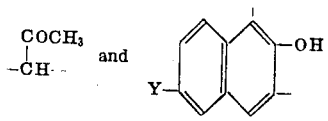

wherein N=N is attached to the one position of the above formula and Y is hydrogen, bromine, methoxy and cyano: and a pigment of the formula

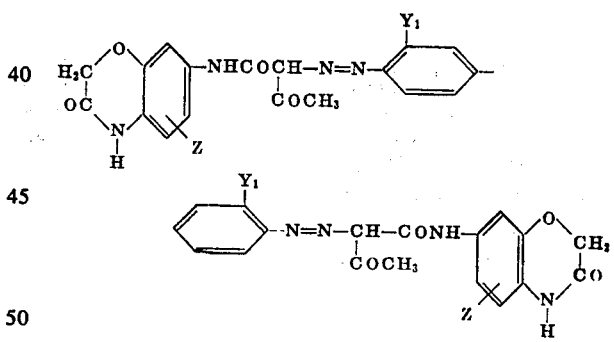

and $Y_1$ is hydrogen, chlorine, lower alkyl or lower alkoxy.

2. A monoazo pigment as claimed in claim 1 of the formula

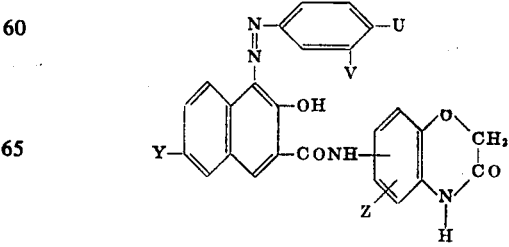

in which X represents hydrogen, chlorine, lower alkyl, lower alkoxy, phenoxy, chlorophenoxy, lower alkylphenoxy, nitro or carbomethoxy, U represents hydrogen, chlorine, nitro or trifluoromethyl, V represents hydrogen, chlorine, trifluoromethyl or, carboxylic amide group selected from the group consisting of -CONH-aryl, wherein aryl is benzene, naphthalene or para-diphenyl or benzene, naphthalene or para-diphenyl substituted with chloro, lower alkyl, lower alkoxy or trifluoromethyl; and a phenomorpholine-(3) group of the formula

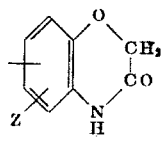

wherein Z is selected from the group consisting of hydrogen, chloro, lower alkyl or lower alkoxy, Z represents hydrogen, chlorine, lower alkyl or lower alkoxy and Y is hydrogen, bromine, methoxy or cyano.

3. A monoazo pigment as claimed in claim 2 of the formula

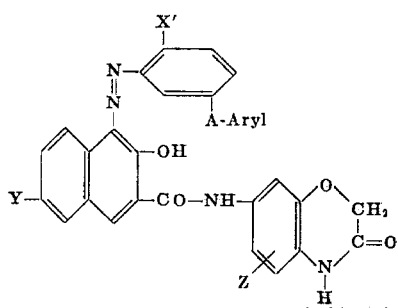

in which X' represents hydrogen, chlorine, lower alkyl or lower alkoxy, A represnts -CONH- group situated in meta- or para-position to the amino group, "aryl" represents benzene, naphthylene or para-diphenyl, or substituted benzene, naphthylene or para-diphenyl wherein the substitutent is chlorine, lower alkyl, lower alkyxy or trifluoromethyl, Z is chlorine, hydrogn, lower alkyl or lower alkoxy, and Y is hydrogen, bromine, methoxy or cyano.

4. A monoazo pigment as claimed in claim 1 of the formula

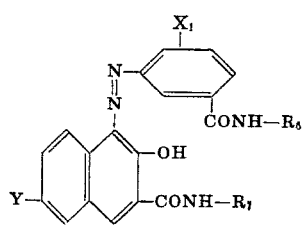

in which $X_1$ represents chlorine, lower alkyl or lower alkoxy, $R_6$ and $R_7$ each represents benzene or substituted benzene wherein the substituent is chloro, lower alkyl, lower alkoxy or trifluoromethyl; or a phenomorpholone-(3) group of the formula

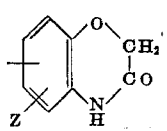

wherein Z is selected from the group consisting of hydrogen, chloro, lower alkyl or lower alkoxy, at least one of the radicals $R_6$ and $R_7$ being a phenomorpholone-(3).

5. A monoazo pigment as claimed in claim 1 of the formula

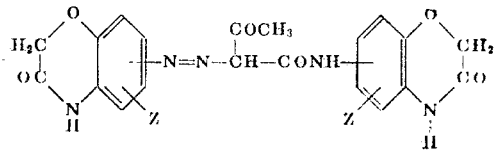

in which Z represents hydrogen, chlorine, lower alkyl or lower alkoxy.

6. A monoazo pigment as claimed in claim 1 of the formula

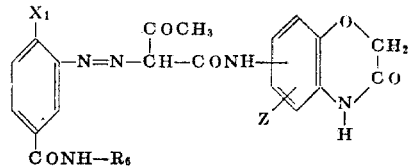

in which $X_1$ represents chlorine, lower alkyl or lower alkoxy, $R_6$ represents benzene or substituted benzene wherein the substituent is chloro, lower alkyl, lower alkoxy or trifluoromethyl; or a phenomorpholone-(3) group of the formula wherein Z is selected from the group consisting of hydrogen, chloro, lower alkyl or lower alkoxy.

7. A disazo pigment as claimed in claim 1 of the formula

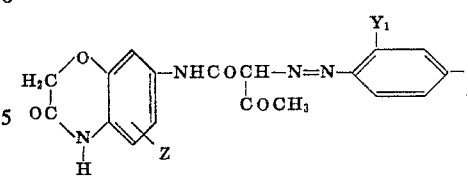

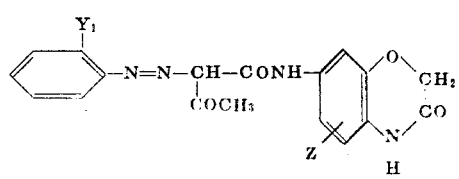

in which $Y_1$ represents hydrogen, chlorine, lower alkyl or lower alkoxy and Z represents hydrogen, chlorine, lower alkyl or lower alkoxy.

8. The compound as claimed in claim 1 of the formula

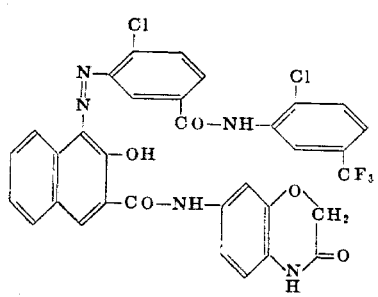

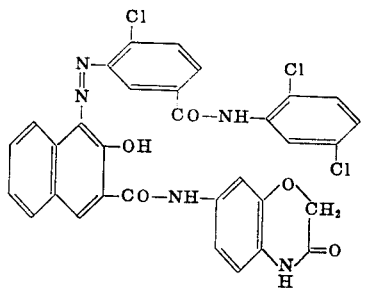
10. The compound as claimed in claim 1 of the formula
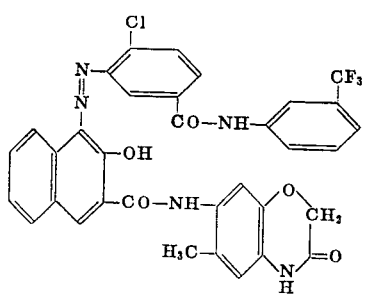
11. The compound as claimed in claim 1 of the formula
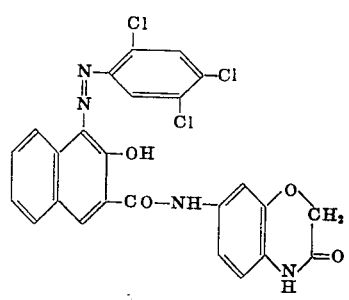
12. The compound as claimed in claim 1 of the formula
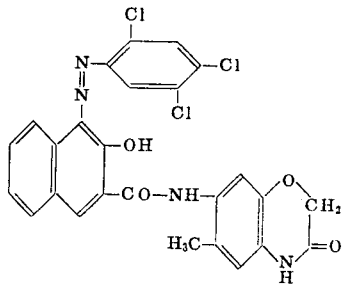
13. The compound as claimed in claim 1 of the formula
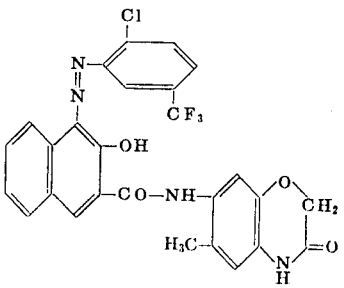
14. The compound as claimed in claim 1 of the formula
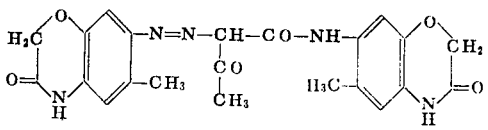

UNITED STATES PATENT OFFICE
CERTIFICATE OF CORRECTION

Patent No. 3,609,134          Dated September 28, 1971

Inventor(s) RUDOLF MORY

It is certified that error appears in the above-identified patent and that said Letters Patent are hereby corrected as shown below:

Column 13, lines 55 to 60, the right-hand side of the formula should read:

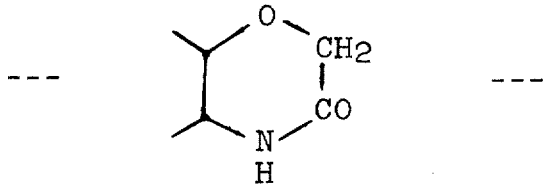

Column 14, line 30, the left-hand side of the formula should read:

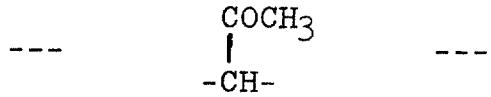

Column 14, line 47, the left-hand side of the formula should read:

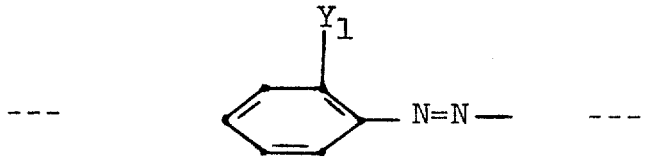

Column 15, line 42, delete "alkyxy" and insert --- alkoxy ---.

Column 16, lines 25 to 35, insert the following

UNITED STATES PATENT OFFICE
CERTIFICATE OF CORRECTION

Patent No. 3,609,134          Dated September 28, 1971

Inventor(s) RUDOLF MORY

It is certified that error appears in the above-identified patent and that said Letters Patent are hereby corrected as shown below:

formula:

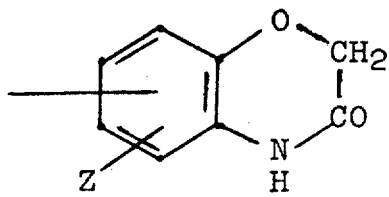

Column 17, line 1, insert --- 9. The compound as claimed in claim 1 of the formula ---.

Column 18, line 4, delete "PAT. NO. 3609134".

Signed and sealed this 25th day of July 1972.

(SEAL)
Attest:

EDWARD M. FLETCHER, JR.          ROBERT GOTTSCHALK
Attesting Officer                Commissioner of Patents